United States Patent
Trotta et al.

(10) Patent No.: US 8,457,267 B2
(45) Date of Patent: Jun. 4, 2013

(54) SYSTEM AND METHOD FOR MULTIPLEXING A TIME-REFERENCE SIGNAL AND A FREQUENCY-REFERENCE SIGNAL

(75) Inventors: Joseph G. Trotta, Plano, TX (US); Noah Gottfried, Johnsonburg, NJ (US); Richard Gammenthaler, McKinney, TX (US)

(73) Assignee: Fujitsu Limited, Kawasaki-shi (JP)

( * ) Notice: Subject to any disclaimer, the term of this patent is extended or adjusted under 35 U.S.C. 154(b) by 272 days.

(21) Appl. No.: 12/971,490

(22) Filed: Dec. 17, 2010

(65) Prior Publication Data
US 2012/0155585 A1  Jun. 21, 2012

(51) Int. Cl.
*H04L 7/00* (2006.01)
*H04L 7/02* (2006.01)
*H04L 7/033* (2006.01)

(52) U.S. Cl.
CPC .......... *H04L 7/0008* (2013.01); *H04L 7/02* (2013.01); *H04L 7/0331* (2013.01); *H04L 7/0337* (2013.01); *H04L 7/033* (2013.01)
USPC .......... 375/354; 375/316; 375/355; 375/356; 375/357; 375/359; 375/371

(58) Field of Classification Search
USPC ............... 375/316, 354, 355, 356, 357, 359, 375/371
See application file for complete search history.

(56) References Cited

U.S. PATENT DOCUMENTS

| | | | |
|---|---|---|---|
| 7,805,638 B2 * | 9/2010 | Jones et al. | 714/47.1 |
| 2006/0256063 A1 * | 11/2006 | An | 345/98 |
| 2009/0243687 A1 * | 10/2009 | Lewis et al. | 327/224 |

* cited by examiner

*Primary Examiner* — Siu Lee
(74) *Attorney, Agent, or Firm* — Baker Botts L.L.P.

(57) ABSTRACT

A system may include a bus carrying signals, a frame pulse generator generating a generally periodic frame pulse signal having timing boundaries delineating consecutive timing periods and a frame pulse enable signal active for a portion of each timing period proximate to the timing boundaries and inactive otherwise, a first controlled buffer driving the frame pulse signal on the bus during durations in which the frame pulse enable signal is active to generate a modified frame pulse, a reference clock controller receiving the modified frame pulse via the bus and generating a reference clock enable signal in response to presence of the modified frame pulse, a reference clock generator generating a generally periodic reference clock signal, and a second controlled buffer driving the reference clock signal on the bus during durations in which the reference clock enable signal is active to generate a modified reference clock.

20 Claims, 3 Drawing Sheets

SYSTEM AND METHOD FOR MULTIPLEXING A TIME-REFERENCE SIGNAL AND A FREQUENCY-REFERENCE SIGNAL

TECHNICAL FIELD OF THE INVENTION

The present invention relates generally to computing systems and, more particularly, to a system and method for multiplexing a time-reference signal and a frequency-reference signal.

BACKGROUND

Networks are often used in telecommunications systems, cable television systems and in data communication to rapidly convey large amounts of information between remote points in the form of datagrams (e.g., packets, frames, or other type of data structure). Networks often employ various network elements to communicate (e.g., receive, transmit, route, and/or forward) the datagrams throughout a network. To synchronize communication of datagrams, network elements may utilize a periodic signal known as a frame pulse, serving as a timing-reference signal. In addition, to synchronize operation of various other components of a network element (e.g., processors, memories, etc.), another periodic signal known as a reference clock may be used as a frequency-reference signal.

Distribution of such timing-reference and frequency-reference signals in a network element or other computing device often requires separate traces of conductive materials or signal busses to communicate these two divergent types of signals. As manufacturers reduce the physical size of network elements and other computing devices, they may often desire to increase capacity by eliminating busses or leveraging the same busses for multiple purposes.

SUMMARY

In accordance with the present invention, disadvantages and problems associated with supporting each of a timing-reference signal and a frequency-reference signal in a computing device may be reduced or eliminated.

In accordance with embodiments of the present disclosure, a system may include a bus for carrying signals, a frame pulse generator configured to generate a generally periodic frame pulse signal having timing boundaries delineating consecutive timing periods and a frame pulse enable signal active for a portion of each timing period proximate to the timing boundaries and inactive otherwise, a first controlled buffer configured to drive the frame pulse signal on the bus during durations in which the frame pulse enable signal is active to generate a modified frame pulse, a reference clock controller configured to receive the modified frame pulse via the bus and generate a reference clock enable signal in response to presence of the modified frame pulse, a reference clock generator configured to generate a generally periodic reference clock signal, and a second controlled buffer configured to drive the reference clock signal on the bus during durations in which the reference clock enable signal is active to generate a modified reference clock.

Certain embodiments of the invention may provide one or more technical advantages. For example, systems and methods provided herein permit multiplexing of a frequency-reference signal and a timing-reference signal on a common bus.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
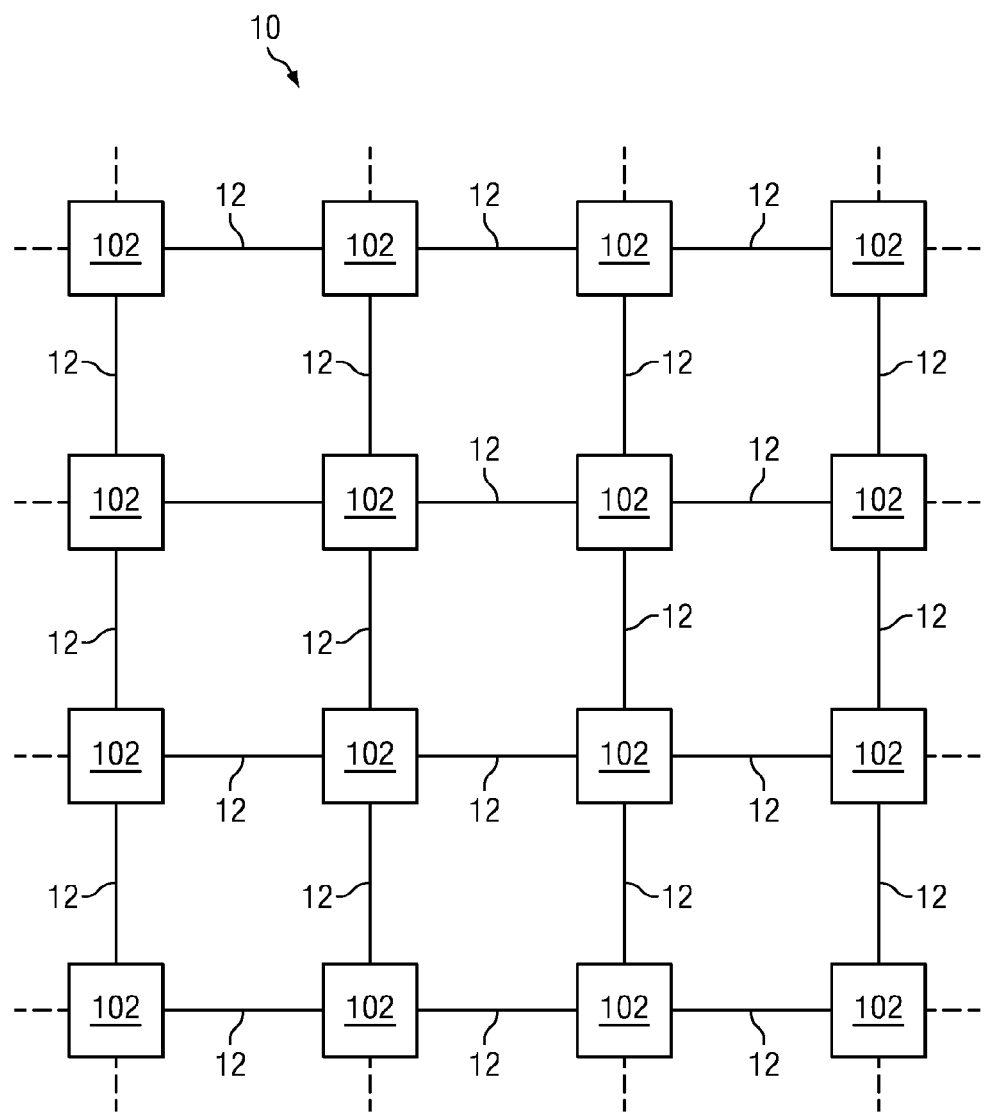
FIG. 1 illustrates a block diagram of an example network, in accordance with embodiments of the present disclosure.
Figure 2:
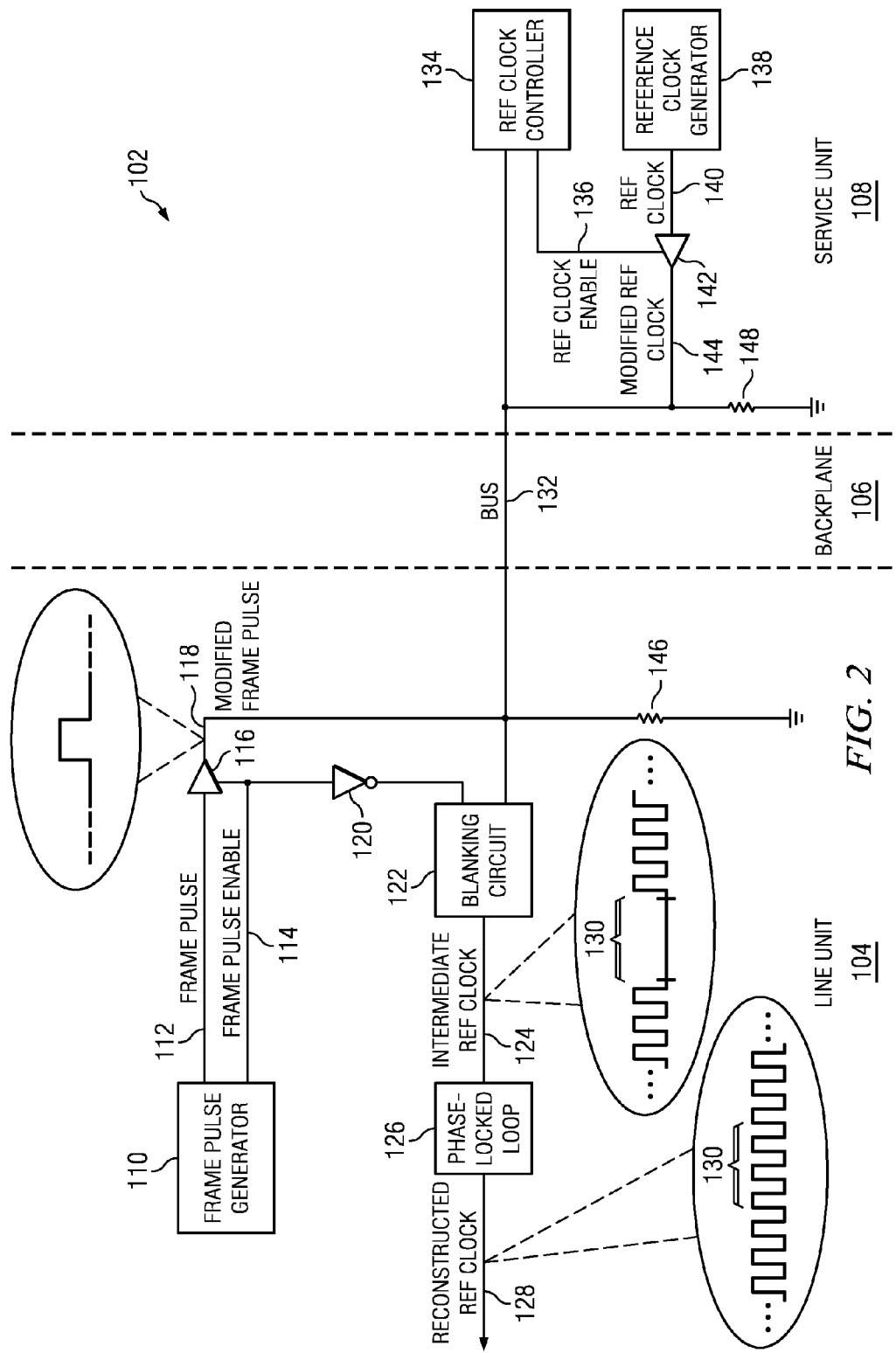
FIG. 2 illustrates a block diagram of selected components of an example network element, in accordance with embodiments of the present disclosure.
Figure 3:
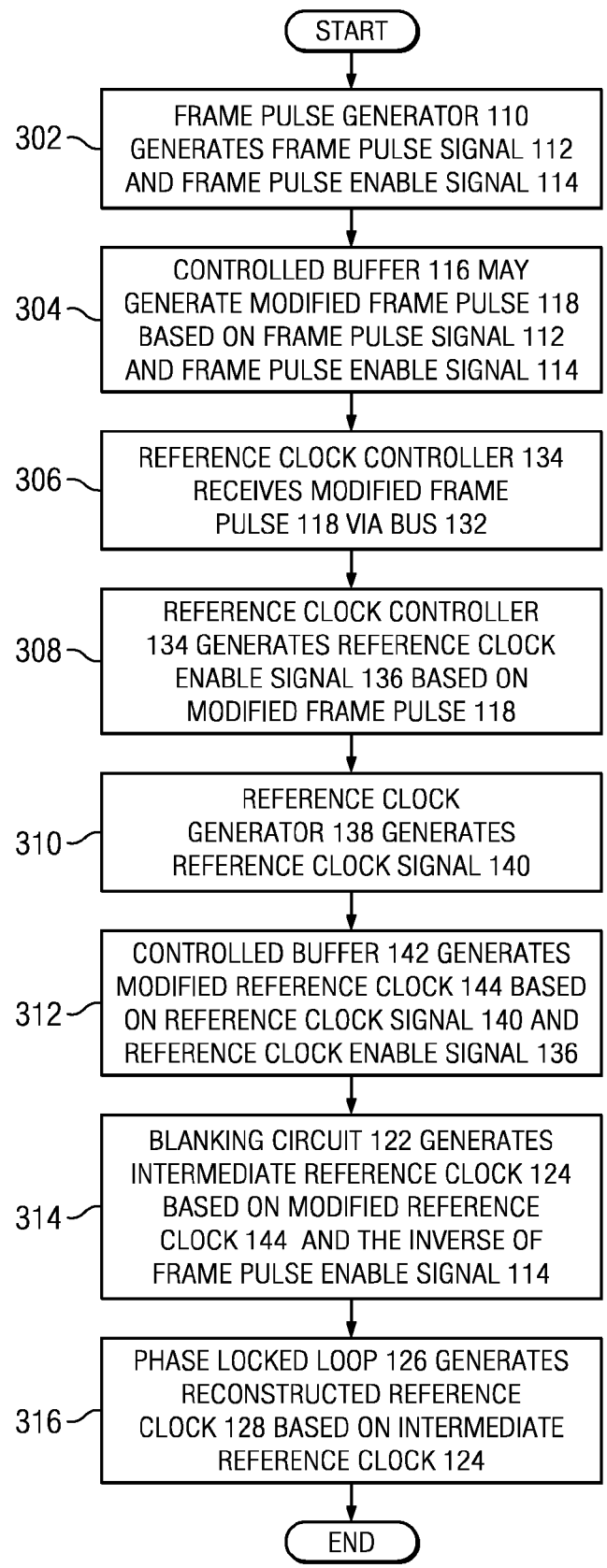
FIG. 3 illustrates a flow chart for an example method for multiplexing a time-reference signal and a frequency-reference signal, in accordance with embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks.

Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram of selected components of an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch or router configured to route data received by network element 102 to another device (e.g., another network element 102) coupled to network element 102.

As depicted in FIG. 2, network element 102 may include a line unit 104, a backplane 106, and a service unit 108. A line unit 104 may include and system, device, or apparatus generally configured to serve as an interface between a network element 102 and a transmission medium 12. Each line unit 104 may enable its associated network element 102 to communicate to other network elements 102 using any suitable transmission protocol and/or standard. Line unit 104 and its various components may be implemented using hardware, software, or any combination thereof. In some embodiments, line unit 104 may be coupled to backplane 106 via a connector formed on or mounted to backplane 106.

As shown in FIG. 2, line unit 104 may include a frame pulse generator 110, a controlled buffer 116, an inverter 120, a blanking circuit 122, a phase aligner 126, and a grounding resistor 146. Frame pulse generator 110 may include any system, device, or apparatus configured to generate a periodic frame pulse signal 112 at a desired frequency and waveform. In some embodiments, frame pulse signal 112 may provide a timing reference for synchronization of datagram communication for network element 102. Accordingly, frame pulse signal 112 may include timing boundaries (e.g., a signal transition) delineating consecutive timing periods (e.g., each timing period defining a portion of time in which a datagram may be received, transmitted, processed, etc.) As shown in FIG. 2, frame pulse generator 110 may also generate a frame pulse enable signal 114, wherein frame pulse enable signal 114 is active (e.g., logic 1 or logic high) for a portion of each timing period of frame pulse signal 112 near the timing boundary, and inactive (e.g., logic 0 or logic low) otherwise.

Controlled buffer 116 may be coupled at its data input and its enable input to frame pulse generator 110 and may include any system, device, or apparatus configured to drive a signal on its output equal to the signal on its data input when an enable signal received by its enable input is active. For example, in network element 102, controlled buffer 116 may receive frame pulse signal 112 on its data input and frame pulse enable signal 114 on its enable input, and drive frame pulse signal 112 during durations in which pulse enable signal 114 is active, thus generating modified frame pulse 118. During durations in which pulse enable signal 114 is inactive, controlled buffer 116 may not drive any signal. As shown in FIG. 2, controlled buffer 116 may be coupled at its output to bus 132 of backplane 106.

Inverter 120 may be coupled at its input to frame pulse generator 110 and may include any system, device or apparatus configured to invert a digital signal driven on its input. For example, if inverter 120 receives a low voltage (e.g., logic 0) driven on its input, it may drive a high voltage (e.g., logic 1) on its output. Alternatively, if inverter 120 receives a high voltage (e.g., logic 1) driven on its input, it may drive a low voltage (e.g., logic 0) on its output. For example, in network element 102, inverter may receive frame pulse signal 112 on its input and drive the logical inverse of frame pulse signal 112 on its output.

Blanking circuit 122 may be coupled at its enable input to the output of inverter 120 and coupled at its data input to bus 132 of backplane 106 and the output of controlled buffer 116. Blanking circuit 122 may include any system, device, or apparatus configured to drive on its output the signal received on its input during durations in which its enable input is active (e.g., logic 1 or logic high), and drive a constant signal (e.g., either of logic 1/logic high or logic 0/logic low) during durations in which its enable input is inactive (e.g., logic 0 or logic low). For example, in some embodiments blanking circuit may be implemented as a logical AND gate. In network element 102, blanking circuit 122 may pass the signal present on bus 132 to its output when frame pulse enable signal 114 is inactive (e.g., logic 0 or logic low), and may drive logic 0/logic low to its output when enable signal 114 is active (e.g., logic 1 or logic high), thus generating intermediate reference clock 124. As shown in FIG. 2, intermediate reference clock 124 may be a generally periodic signal having characteristics of modified reference clock 144 driven over bus 132 (as described below), with a gap 130 corresponding to the duration in which enable signal 114 is active and blanking circuit 122 "blanks" its output by driving logic 0/logic low at its output.

Phase aligner 126 may be coupled at its input to the output of blanking circuit 122 and may include any system, device, or apparatus configured to synchronize an incoming signal at its input, and maintain synchronization in spite of noise or variations in the incoming signal frequency. Fore example, phase aligner 126 may include a phase locked loop (PLL), a digital clock recovery circuit, a custom digital phase aligner, or other suitable system In network element 102, phase locked loop may receive intermediate reference clock 124 as its incoming input signal and drive at its output a reconstructed reference clock 128 in which gap 130 is replaced with periodic waveforms substantially identical to the remainder of reconstructed reference clock 128.

Grounding resistor 146 may be coupled between bus 132 and an electrical ground, and may include any system, device, or apparatus configured to resist the flow of electrical current. In network element 102, grounding resistor 146 may be selected to have a high resistance so as to not affect any signal driven on bus 132, but itself drive bus 132 to ground when bus 132 is not driven by any other signal.

Backplane 106 may include any system, device, or apparatus that includes two or more connectors electrically coupled to each other, thus allowing components coupled to such connectors (e.g., line unit 104 and service unit 108) to communicate signals to each other. As shown in FIG. 2, backplane 106 may include a bus 132 communicatively coupling components of line unit 104 and service unit 108. In some embodiments, bus 132 may include a single trace of electrical conductor electrically coupling a connector holding line unit 104 and a connector holding service unit 108.

Service unit 108 may include any system, device, or apparatus configured to terminate a signal originating on another network element 102 and extract frequency information from such signal while originating one or more other signals requiring time synchronization with the internal frame pulse towards the same and/or other network elements 102. As depicted in FIG. 2, service unit 108 may include a reference clock controller 134, a reference clock generator 138, a controlled buffer 142, and a grounding resistor 148. Reference clock controller 134 may be coupled at its input to bus 132 and may include any system, device, or apparatus configured to based on modified frame pulse 118 received via bus 132, generate a reference clock enable signal 136 at its output such that reference clock enable signal 136 is generally active (e.g., logic 1 or logic high) when frame pulse enable signal 114 is inactive (e.g., logic 0 or logic low), and vice versa. In some embodiments, reference clock controller 134 may be implemented in a field-programmable gate array (FPGA).

Reference clock generator 138 may include any system, device, or apparatus configured to generate a periodic reference clock signal 140 at a desired frequency and waveform. In some embodiments, reference clock signal 140 may provide a frequency reference for various components of element 102. In some embodiments, the frequency of reference clock signal 140 may be many orders of magnitude greater than the frequency of frame pulse signal 112 (e.g., approximately 12.96 MHz vs. approximately 2 KHz). In addition, reference clock signal 140 may have a random and/or dynamic phase and/or time relationship to frame pulse signal 112 (e.g., no time relationship between reference clock signal 140 and frame pulse signal 112).

Controlled buffer 142 may be coupled at its data input to reference clock generator 138 and at its enable input to reference clock controller 134 and may include any system, device, or apparatus configured to drive a signal on its output equal to the signal on its data input when an enable signal received by its enable input is active. For example, in network element 102, controlled buffer 116 may receive reference clock signal 140 on its data input and reference clock enable signal 136 on its enable input, and drive reference clock signal 140 during durations in which reference clock enable signal 136 is active, thus generating reference clock 144 During durations in which reference clock enable signal 136 is inactive, controlled buffer 142 may not drive any signal. As shown in FIG. 2, controlled buffer 142 may be coupled at its output to bus 132 of backplane 106.

Grounding resistor 148 may be coupled between bus 132 and an electrical ground, and may include any system, device, or apparatus configured to resist the flow of electrical current. In network element 102, grounding resistor 146 may be selected to have a high resistance so as to not affect any signal driven on bus 132, but itself drive bus 132 to ground when bus 132 is not driven by any other signal.

The operation of the various selected components of network element 102 is described in FIG. 3. FIG. 3 illustrates a flow chart for an example method 300 for multiplexing a time-reference signal and a frequency-reference signal, in accordance with embodiments of the present disclosure. According to some embodiments, method 300 may begin at step 302. As noted above, teachings of the present disclosure may be implemented in a variety of configurations of network 10 and/or network element 102. As such, the preferred initialization point for method 300 and the order of the steps 302-316 comprising method 300 may depend on the implementation chosen.

At step 302, frame pulse generator 110 may generate frame pulse signal 112 and frame pulse enable signal 114. At step 304, controlled buffer 116 may, based on frame pulse signal 112 and frame pulse enable signal 114 generate modified frame pulse 118 such that controlled buffer 116 drives a signal similar to frame pulse signal 112 for a portion of each timing period of frame pulse signal 112 near the timing boundary of frame pulse signal 112, and drives no signal otherwise.

At step 306, reference clock controller 134 may receive modified frame pulse 118 via bus 132. At step 308, based on modified frame pulse 118, reference clock controller 134 may generate reference clock enable signal 136. In some embodiments, reference clock enable signal 136 may generally be active (e.g., logic 1 or logic high) when frame pulse enable signal 114 is inactive (e.g., logic 0 or logic low), and vice versa.

At step 310, reference clock generator 138 may generate reference clock signal 140. At step 312, controlled buffer 142 may, in response to one or more of reference clock signal 140 and reference clock enable signal 136, generate modified reference clock 144 and drive modified reference clock 144 in durations in which reference clock enable signal 136 is active.

At step 314, blanking circuit 122 may receive modified reference clock 144 via bus 132 and the inverse of frame pulse enable signal 114 (generated by inverter 120) and, based on such received signals, generate intermediate reference clock 124. As described above, intermediate reference clock 124 may be a generally periodic signal having characteristics of modified reference clock 144 driven over bus 132 (as described below), with a gap 130 corresponding to the duration in which enable signal 114 is active and blanking circuit 122 "blanks" its output by driving an appropriate signal at its output.

At step 316, phase aligner 126 may receive intermediate reference clock 124 and, based on intermediate reference clock 124, generate reconstructed reference clock 128 as a periodic signal having a frequency approximately equal to the frequency of reference clock signal 140 such that gap 130 is replaced with periodic waveforms substantially identical to the remainder of reconstructed reference clock 128. Elimination of gap 130 may be critical in many applications which require that all edges (e.g., cycles) of a reference clock be present for normal functionality. Various steps of the above method may be repeated as many times as desired.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network element 102 or any other system operable to implement method 300 (e.g., a computing system). In certain embodiments, method 300 may be implemented partially or fully in software and/or firmware embodied in a memory or other computer-readable media and executable by a processor or other suitable device.

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   a bus for carrying signals;
   a frame pulse generator configured to generate a generally periodic frame pulse signal having timing boundaries delineating consecutive timing periods and a frame pulse enable signal active for a portion of each timing period proximate to the timing boundaries and inactive otherwise;
   a first controlled buffer configured to drive the frame pulse signal on the bus during durations in which the frame pulse enable signal is active to generate a modified frame pulse;
   a reference clock controller configured to receive the modified frame pulse via the bus and in response to presence of the modified frame pulse, generate a reference clock enable signal;
   a reference clock generator configured to generate a generally periodic reference clock signal; and
   a second controlled buffer configured to drive the reference clock signal on the bus during durations in which the reference clock enable signal is active to generate a modified reference clock.

2. The system according to claim 1, further comprising a blanking circuit configured to receive the modified reference clock and drive the modified reference clock at its output during durations in which the frame pulse enable signal is inactive to generate an intermediate reference clock.

3. The system according to claim 2, wherein the intermediate reference clock comprises a generally periodic signal with a gap corresponding to a duration in which the frame pulse enable signal is active.

4. The system according to claim 3, further comprising a phase aligner configured to receive the intermediate reference clock at its input and drive at its output a reconstructed reference clock substantially similar to the intermediate reference clock wherein the gap of the intermediate reference clock is replaced with periodic waveform substantially identical to the remainder of the reconstructed reference clock.

5. The system according to claim 4, wherein the frame pulse signal is a timing reference and the reference clock signal is a frequency reference, the timing reference and the frequency reference having a random time relationship.

6. The system according to claim 1, further comprising the reference clock controller configured to generate the reference clock enable signal such that the reference clock enable signal is generally active when the frame pulse enable signal is inactive and the reference clock signal is generally inactive when the frame pulse enable signal is active, the reference clock enable signal coupled to an enable input of the second controlled buffer such that the reference clock enable signal controls the modified reference clock.

7. The system according to claim 1, the bus comprising a single trace of electrical conductor electrically coupling an output of the first controlled buffer and an output of the second controlled buffer.

8. The system according to claim 1, the bus disposed in backplane.

9. A method comprising:
   generating a generally periodic frame pulse signal having timing boundaries delineating consecutive timing periods;
   generating a frame pulse enable signal that is active for a portion of each timing period proximate to the timing boundaries and inactive otherwise;
   driving the frame pulse signal on a bus during durations in which the frame pulse enable signal is active to generate a modified frame pulse;
   generating a reference clock enable signal in response to presence of the modified frame pulse;
   generating a generally periodic reference clock signal;
   driving the reference clock signal on the bus during durations in which the reference clock enable signal is active to generate a modified reference clock.

10. The method according to claim 9, further comprising driving the modified reference clock during durations in which the frame pulse enable signal is inactive to generate an intermediate reference clock.

11. The method according to claim 10, wherein the intermediate reference clock comprises a generally periodic signal with a gap corresponding to a duration in which the frame pulse enable signal is active.

12. The method according to claim 11, further comprising driving a reconstructed reference clock substantially similar to the intermediate reference clock wherein the gap of the intermediate reference clock is replaced with periodic waveform substantially identical to the remainder of the reconstructed reference clock.

13. The method according to claim 12, wherein the frame pulse signal is a timing reference and the reference clock signal is a frequency reference, the timing reference and the frequency reference having a random time relationship.

14. The method according to claim 9, further comprising:
   generating the clock enable signal such that the reference clock enable signal is generally active when the frame pulse enable signal is inactive and the reference clock signal is generally inactive when the frame pulse enable signal is active; and
   controlling the modified reference clock with the clock enable signal.

15. The method according to claim 9, the bus comprising a single trace of electrical conductor electrically coupling a first node at which the modified frame pulse is driven to a second node the modified reference clock is driven.

16. The method according to claim 9, the bus disposed in backplane.

17. A network element comprising:
a backplane including a bus for carrying signals;
a line unit comprising:
  a frame pulse generator configured to generate a generally periodic frame pulse signal having timing boundaries delineating consecutive timing periods and a frame pulse enable signal active for a portion of each timing period proximate to the timing boundaries and inactive otherwise;
  a first controlled buffer configured to drive the frame pulse signal on the bus during durations in which the frame pulse enable signal is active to generate a modified frame pulse;
a service unit comprising:
  a reference clock controller configured to receive the modified frame pulse via the bus and in response to presence of the modified frame pulse, generate a reference clock enable signal;
  a reference clock generator configured to generate a generally periodic reference clock signal; and
  a second controlled buffer configured to drive the reference clock signal on the bus during durations in which the reference clock enable signal is active to generate a modified reference clock.

18. The network element according to claim 17, the line unit further comprising a blanking circuit configured to receive the modified reference clock and drive the modified reference clock at its output during durations in which the frame pulse enable signal is inactive to generate an intermediate reference clock.

19. The network element according to claim 18, wherein the intermediate reference clock comprises a generally periodic signal with a gap corresponding to a duration in which the frame pulse enable signal is active.

20. The network element according to claim 19, the line unit further comprising a phase aligner configured to receive the intermediate reference clock at its input and drive at its output a reconstructed reference clock substantially similar to the intermediate reference clock wherein the gap of the intermediate reference clock is replaced with periodic waveform substantially identical to the remainder of the reconstructed reference clock.

* * * * *